United States Patent [19]

Doherty, Jr.

[11] 4,117,976
[45] Oct. 3, 1978

[54] MULTI-FUNCTION THERMOSTATIC VALVE

[75] Inventor: John Doherty, Jr., Assonet, Mass.

[73] Assignee: Texas Instruments Incorporated, Dallas, Tex.

[21] Appl. No.: 724,182

[22] Filed: Sep. 17, 1976

[51] Int. Cl.² .......................................... G05D 23/10
[52] U.S. Cl. .......................... 236/48 R; 137/625.18; 236/87; 236/101 C; 236/48 R;87;10 C
[58] Field of Search ....................... 137/625.18, 625.5; 123/117 A

[56] References Cited

U.S. PATENT DOCUMENTS

| | | | |
|---|---|---|---|
| 2,461,904 | 2/1949 | Vaughan | 236/48 R X |
| 3,071,936 | 1/1963 | Irwin | 137/625.18 X |
| 3,812,382 | 5/1974 | Scott | 137/625.18 X |
| 3,863,810 | 2/1975 | Hanson | 137/625.18 X |
| 4,026,464 | 5/1977 | Doherty, Jr. | 236/48 R |

Primary Examiner—William E. Wayner
Assistant Examiner—William E. Tapolcai
Attorney, Agent, or Firm—John A. Haug; James P. McAndrews

[57] ABSTRACT

An improved multi-function, thermal valve assembly has four ports with two passages sealingly separated one from another; the first passage connecting the first two ports and the second passage connecting the second two ports. Each of the passages has a valve seat contained therein. The valve assembly employs at least one thermally responsive actuating member which is actuable to move a valve switching means in each of the two passages simultaneously to either open or close one or both of the valve seats contained in the two passages thereby changing communication between the first two ports and between the second two ports.

10 Claims, 6 Drawing Figures

4,117,976

MULTI-FUNCTION THERMOSTATIC VALVE

BACKGROUND AND SUMMARY OF INVENTION

This invention relates to a thermally actuated valve assembly and more particularly to a multi-function thermal vacuum valve useful for instance in automotive emission control systems.

Various thermally actuated valves have been used for automotive applications. For example, wax actuated valves have long been used. These valves consist of a spool valve which is actuated by a volume change of wax upon reaching a predetermined temperature. These valves, however, have drawbacks and limitations. The valves are subject to loss of wax due to high pressure build up and consequently can exhibit a shift in operating temperature and are actuable at only one temperature. Also the spool valve design allows for cross venting when connected to more than one pneumatic source. Additionally they are costly to manufacture.

Thermally actuated valves incorporating bimetallic members as the actuating means such as described in copending application Ser. No. 530,800, entitled Doubled Throw Thermal Valve, filed Dec. 9, 1974, now abandoned, and copending application Ser. No. 641,795, entitled Dual Function Thermal Valve, filed Dec. 18, 1975, now U.S. Pat. No. 4,026,464, each having the same assignee as the present application have also been used. These valves have proved successful but still these valves have the inherent disadvantage for certain applications of allowing possible cross venting. Also the valves cannot be tested prior to final assembly.

Accordingly it is an object of this invention to provide an improved thermally responsive multi-function valve in which cross venting is prevented. It is another object of this invention to provide a thermally responsive multi-function valve in which the functions can be switched simultaneously at one temperature or in sequence at two different temperatures. It is still another object of this invention to provide thermally responsive multi-function valve which can be tested prior to final assembly. It is yet another object to provide a thermally responsive multi-function valve which provides for communication between two separate vacuum sources and two separate activity ports. It is yet still another object to provide a thermally responsive valve which is compact in size, reliable in operation and easy to construct. Other objects and features of this invention will be in part apparent and in part pointed out hereinafter.

Briefly the thermally responsive multi-function valve of this invention comprises a two part valve body, a first part having two pairs of ports extending from the body and a valve switching assembly contained therein and a second part with a central cavity in which the first part is partially housed. The valve switching assembly provides for two chambers isolated one from another in the first valve body. One pair of the ports are positioned to be in communication with each of the chambers thereby providing two passages in the valve body. The passages each have a valve seat contained therein. In the bottom of the cavity in the second part, a support post is disposed upon which a multi-member thermostatic disc assembly is mounted. The assembly comprises two preformed thermostatic discs with a spring member contained therebetween within a disc carrier or housing member. The two disc members are provided to be actuable at different predetermined temperatures. Touching the top of the disc assembly is a motion transfer pin with two valve plug members which extends into the first valve part and valve switching assembly so that a valve plug is positioned to act as a valve seal in each of the chambers. A sealing means with two wiper seals is positioned around the transfer pin to provide isolation between the chambers while still allowing slidable movement of the pin. A spring member biases the pin to be in engagement with the disc assembly.

Initially, in a first temperature range, the transfer pin engages the disc assembly while positioning the first plug or valve seal to engage the first valve seat and thereby block communication in the first passage between the first two ports and positioning the second plug or valve seal to be out of engagement with the second or bottom valve seat thereby providing communication in the second passage between the second two ports. At a second predetermined temperature, one of the discs members snaps to an inverted dish-shaped configuration which causes the first valve plug to move out of engagement with the first valve seat but does not move the second valve seal into engagement with the second valve seat thereby providing communication between the first two ports and the second two ports but not between them. Finally at a third pre-determined temperature, the second of the disc members snaps to an inverted dish-shaped configuration which moves the second valve seal into engagement with the second valve seat thereby only providing communication between the first two ports.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
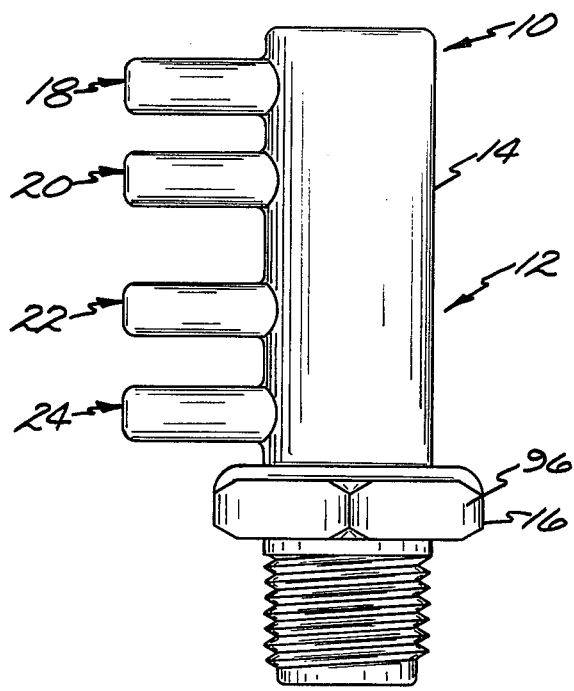
FIG. 1 is a front plan view of the valve assembly of this invention.

Referring now to the drawings, a dual function thermally responsive valve assembly 10 of this invention has a generally cylindrical valve body 12 comprising a first valve part 14 and a second valve part 16. The first valve part 14 as shown in FIGS. 1-4 has first, second, third and fourth ports 18, 20, 22, and 24 which open generally perpendicular to the main axis of the body part 14. The four ports 18, 20, 22 and 24 each have central bores 26, 28, 30 and 32 respectively which run the entire length of the ports and respective external nipple portions 34, 36, 38 and 40. First valve part 14 and ports 18, 20, 22 and 24 are preferably made from one piece of material such as glass-filled nylon. Ports 18, 20, 22 and 24 are typically connected with tubing (not shown) which run between valve 10 and vacuum or vent sources and control functions which the valve operates. The disposition of the ports are conveniently parallel and adjacent to one another yielding a valve which is compact in size.

Figure 2:
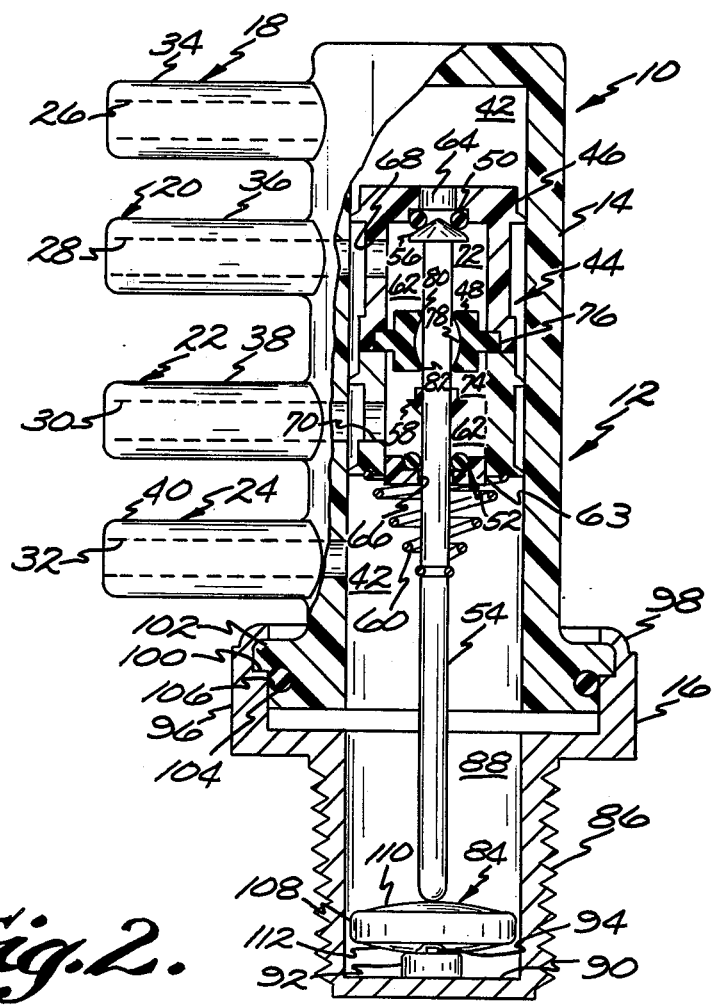
FIG. 2 is a partial sectional view of FIG. 1 with the upper valve seat closed.
Figure 3:
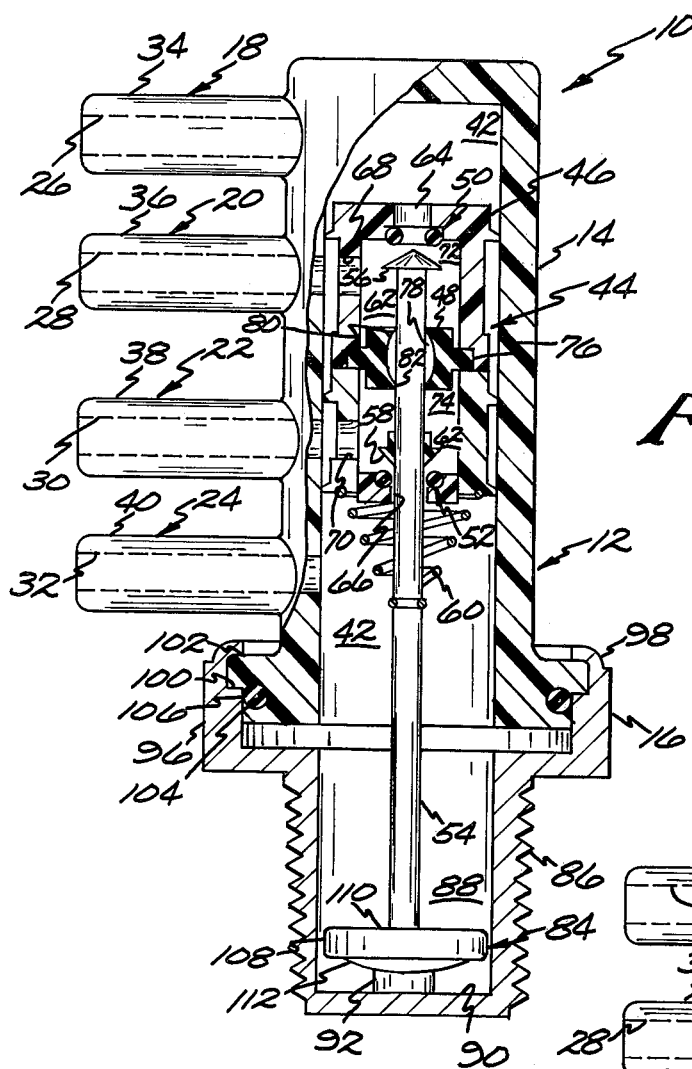
FIG. 3 is a similar view to FIG. 2 only with neither the upper nor the lower valve seat closed.
Figure 4:
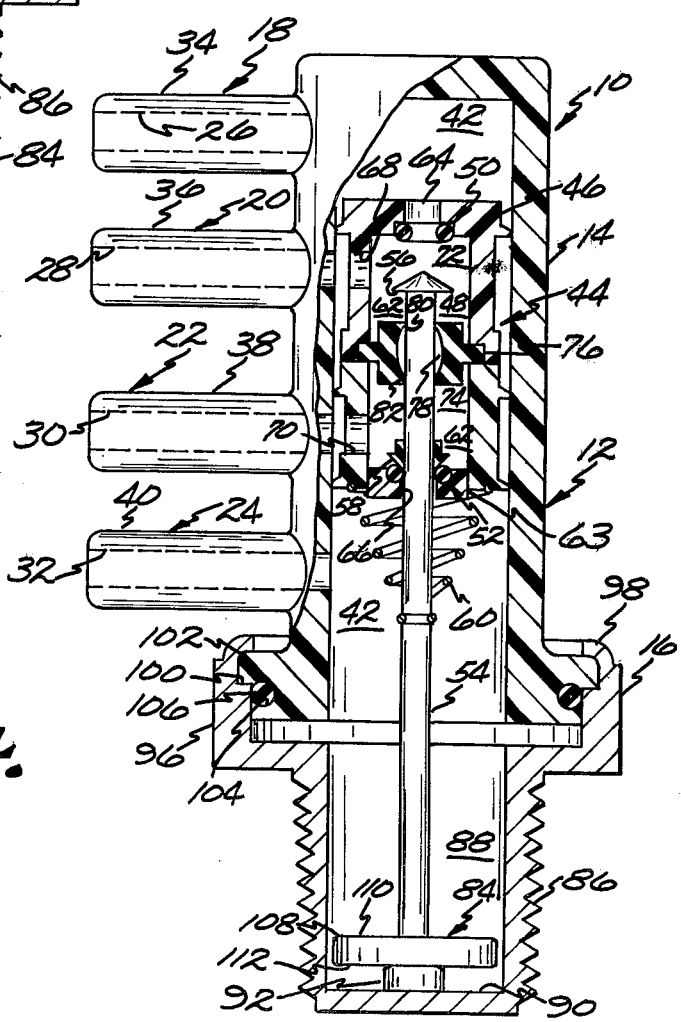
FIG. 4 is a similar view to FIG. 2 only with the upper valve seat open and the lower valve seat closed.

Central bores 26, 28, 30, and 32 all connect with a main central chamber or cavity 42 within first valve part 14. Positioned within cavity 42 is a valve switching means 44 as best shown by FIGS. 2-4. Valve switching means 44 comprises a housing member 46, a sealing means 48, two valve seats 50 and 52, a motion tranfer pin 54 with a pair of valve plugs 56 and 58, a biasing means 60, and a bimetallic disc assembly 84.

Housing member 46 is of a generally cylindrical shape with a central cavity 62 and may be made from a one piece construction although a multipiece construction is shown to provide for easy calibration as will be discussed below. The material for the housing may be made from glass-filled nylon or the like. The housing has a first or top opening 64 and a second or bottom opening 66 which lead into main housing cavity 62. The respective outlets of the top and bottom openings into cavity 62 preferably contain an O-ring which acts as the first or top valve seat 50 and the second or bottom valve seat 52 respectively for the valve. The valve seats are preferably formed of an elastomeric material such as rubber to be adapted to provide a tight seal with valve plug members 56 and 58 to be discussed more fully below. A bottom portion 63 of housing 62 which holds bottom valve seat 52 is preferably movable up and down in the housing to provide for fine calibration. Additionally a first and a second opening 68 and 70 respectively are provided in the side wall of the housing in which first opening 68 is adjacent central bore 28 and second opening 70 is adjacent central bore 30.

In accordance with this invention a sealing means 48 is mounted in the side wall of housing 46 for dividing the housing cavity 62 into a first or top portion 72 and a second or bottom portion 74. That is, the sealing means or member is positioned between the first and second valve seat 50 and 52 and the first and second side wall openings 68 and 70 so that first valve seat and the first side wall opening are on one side of the valve sealing member and the second valve seat and the second side wall opening are on the other. The valve sealing member is generally cylindrical in shape with an outer ring 76 which secures the member in the housing. The sealing member has a central aperture 78 running through it with a top and a bottom portion of the sidewall around the aperture formed into V-shaped wiper seals 80 and 82 adapted to slidingly engage a motion transfer pin 54 contained within the aperture while still providing a tight seal with the pin. That is the V-shaped wiper seals allow for free movement of the motion transfer pin within the valve sealing means while sealingly isolating top cavity portion 74 above the sealing member from bottom cavity portion 76 below the sealing member. Motion transfer pin 54 may be made from any suitable material such as low carbon steel. Accordingly first and second plug or stopper members 56 and 58 are disposed on the motion transfer pin. The plug members are generally conical in shape and preferably formed from an elastomeric material such as rubber although plastic or metal may be used. The first plug 56 is positioned in the first cavity portion 72 adjacent first valve seat 50 and the second plug 58 is positioned in the second cavity portion 74 adjacent second valve seat 52. The purpose of the conical shape is to allow them to reliably seal the valve seat.

Biasing coil spring means is shown in FIGS. 2-4 with one end secured to transfer pin 54 and the other end resting against the under side of housing 62. Spring 60 serves to bias first and second plugs 56 and 58 and correspondingly transfer pin 54 downward as shown in FIGS. 2-4. The spring has a predetermined spring constant which is compatible with the snap force of the bimetallic disc assembly 84 to be discussed further below.

The second valve body part is generally indicated by numeral 16 and is shown to comprise a cup-shaped member adapted to be sealingly secured to first body part 14. More particularly second body part comprises a member of thermally conductive material such as brass having a hollow externally threaded portion 86 and a central cavity 88 with preferably a flat bottom 90 with a support post 92 disposed therein. The support post 92 preferably has a centrally located pin 94 as shown only in FIG. 2 on which the bimetallic disc assembly 84 rests.

Accordingly body part 16 has a hexagonal portion 96 enabling the valve assembly 10 to readily be inserted in a threaded hole and also a relatively thin wall 98 extending upwardly from the hexagonal shaped portion 96. A shoulder 100 is formed at the junction of wall 98 with the remainder of portion 96 and against which a first circular projection 102 of body part 14 bears when the two body parts are assembled. A sealing gasket 104 (e.g. an O-ring) is disposed in a notched portion 106 of body part 14 and is compressed when side wall 98 is rolled over to sealingly secure the two valve portions together to form valve body 12.

Figure 5:
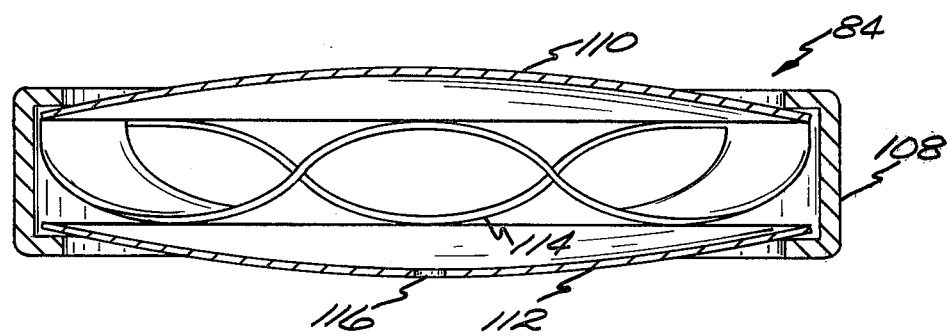
FIG. 5 is a cross-sectional view of a bimetallic assembly of FIGS. 2-4.

As best shown by FIG. 5 a bimetallic assembly 84 comprises a carrier or support housing 108, a first and a second dish-shaped bimetallic element 110 and 112 and a wave spring 114. Dish-shaped bimetallic elements 110 and 112 each have one layer of metal of a low thermal coefficient of expansion and another layer of metal of a somewhat higher thermal coefficient of expansion so that at respective predetermined temperatures the elements will snap over center to an inverted dish-shaped configuration. The metal materials and the amount of preforming or dishing for the two bimetallic elements are chosen such that the two snap over center at different temperatures.

Accordingly first dish-shaped element 110, wave spring 114, and second dish-shaped element 112 are secured in support housing 108 by any conventional means (e.g. the end portions of the walls of the housing can be rolled over to secure the spring and elements as shown in FIG. 5). The two dish-shaped elements are preferably positioned in the support housing so as to have an initial concave outward orientation with the low expansion side (LES) of the material facing outward from the center of the assembly. The bimetallic assembly has a first position when both first and second member elements are positioned concave outward as shown by FIGS. 2 and 5, a second position when first member is concave inward and second member is concave outward as shown by FIG. 3, and a third position when both first and second members are concave inward as shown by FIG. 4. Preferably element 112 has a central aperture 116 for receiving the support post pin 94.

The transfer pin 54 is in contact with the bimetallic assembly and extends through the bottom opening 66 of the housing and through the sealing means 48 up to the top opening 64. The alignment of the pin is preferably controlled by sealing means 48 which slidingly but sealing receives the pin. The length of the pin, the distance between valve seats, and the distance the two bimetallic member snap are coordinated such that when bimetallic assembly 84 is in its first, second, or third position, first and second plugs 56 and 58 correspondingly close only the first valve seat, close neither valve seat or close only the second valve seat.

Valve assembly 10 is particularly adapted to be threaded into an object, such as an automotive engine block or the like, to transfer heat from the engine block to bimetallic assembly 84 so as to heat the member in response to a corresponding temperature increase of the block. Upon cooling of the engine block, the member will also be maintained at approximately the temperature of the engine.

When valve assembly is installed in a cold engine bimetallic assembly 84 is in the first position as shown in FIG. 2 thus providing that first plug 56 seals first valve seat 52 and second plug 58 is positioned within bottom cavity portion out of engagement with second valve seat 54. This condition allows for passage between ports 22 and 24. As the engine heats up to say 125° F., bimetallic member 110 snaps to an inverted dish-shaped configuration thereby providing for first plug 56 to move out of engagement with first valve seat 52 and for second plug 56 to move toward second valve seat 54 but not in engagement with it. This condition allows for passage between ports 18 and 20 and between 22 and 24 but prohibits communication between the two passages. Then as the engine heats up more to say 150° F., bimetallic member 112 snaps to an inverted dish-shaped configuration as shown by FIG. 4 thereby providing for first plug 56 to move still further downward in top cavity portion 72 and second plug 58 to move into engagement with second valve seat 54. This condition allows for passage between ports 18 and 20 alone.

In a typical automotive emission control system the snap temperatures of both members 110 and 112 are below a mean operating temperature to which the valve may be subjected. The temperature override beyond the valve switching temperature will cause the bimetallic members to continue to creep after snapping thereby exerting more force on the plug. In order to avoid compression set of the elastomeric valve material and overstressing of the bimetallic members, wave spring 114 is employed to absorb some of the force by deflecting at a predetermined force level.

In accordance with this invention the use of the valve switching means 44 with sealing means 48 prohibits any cross-venting between the passages both in operation or during switching which is important for reliable operation. The sealing means isolates the upper cavity portion from the lower cavity portion while still providing for efficient valve switching. Additionally testing of the valve can be performed prior to final assembly of first valve body part into second valve body part and the valve can be easily calibrated. These features allow for a more reliable, less expensive valve.

Figure 6:
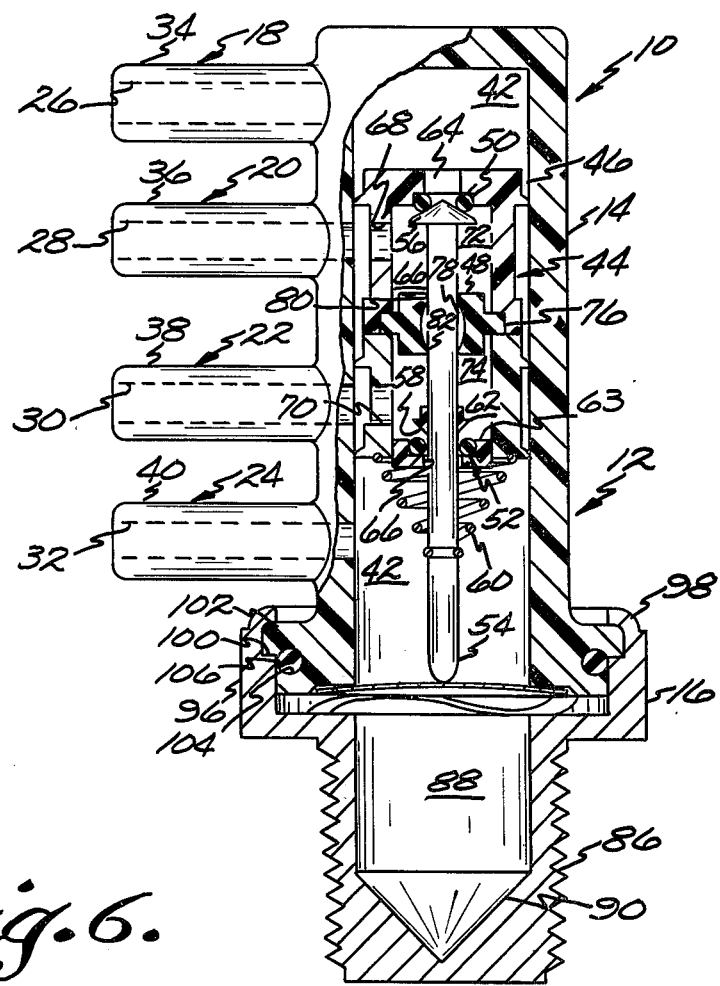
FIG. 6 is a partial section view of a second embodiment of this invention.

In FIG. 6 an alternate embodiment of this invention is shown in which the bimetallic disc assembly 84 is replaced with a single snap action disc 200. The valve functions in the same manner except the bimetallic member only has two positions (i.e. one in which the first plug is in contact with the first valve seat while second plug is free from the second valve seat and one in which the second plug is in contact with the second valve seat while the first plug is free from the first valve seat). The first position provides communication only between ports 22 and 24 and the second position provides communication only between ports 18 and 20. Many other variations are possible with the single disc actuation member such as inverting the bottom valve seat and positioning the bottom valve plug under it similar to the top valve seat and plug arrangement which provides for simultaneous switching at one temperature.

It should be understood that the disc or discs can be initially positioned in any desired dishing configuration as can be the plug members and the above-mentioned embodiments show but two preferred embodiments. It is within the scope of this invention to cover any thermally responsive control mechanism of the character above-described comprising a valve body with a valve switching means mounted in said body which provides for valve switching of more than one passage without cross-venting in response to actuation by at least one thermally responsive dish-shaped member mounted in the valve body.

Although the present invention has been shown and illustrated in terms of specific preferred embodiments, it will be apparent that changes and modifications are possible without departing from the spirit and scope of the inventions and defined in the appended claims.

I claim:

1. A thermally responsive valve assembly comprising a valve body, said body having a central chamber with a first and a second passage therein which are sealingly separated one from another, two valve seats disposed in said body, the first positioned in said first passage and the second positioned in said second passage, and valve switching means including a bimetallic disc assembly and valve seat sealing means, said disc assembly having two bimetallic members which are movable in response to temperature change at respective, distinctly different temperatures to cause said valve seat sealing means to move into and out of engagement with said first and said second seats thereby providing communication in only the first passage, communication in only the second passage, and communication in both passages, said valve switch means further comprising a first and a second plug member to respectively seal said first and said second valve seats, motion transfer means positioned to be in contact with said bimetallic disc assembly and to be movable in response to movement of disc assembly and a sealing member sealingly and slidably engaging said motion transfer means thereby allowing free movement of said motion transfer means to cause said pair of plug seals to move into and out of engagement with said valve seats in response to movement of said bimetallic members while still providing for isolation of the first passage from said second passage.

2. A thermally responsive valve assembly as set forth in claim 1 wherein said sealing member contains at least one wiper seal.

3. A thermally responsive valve assembly as set forth in claim 2 further comprising a wave spring positioned between the two bimetallic members.

4. A thermally responsive valve assembly comprising a valve body having a first part at one end of said valve body and a second part at another end of said body, the first part of the body having a first, a second, a third, and a fourth port, said ports being adapted for connection to fluid lines, a central cavity into which all ports communicate, two passages defined in said body, said first passage connecting said first port and second port and said second passage connecting said third port and said fourth port, two valve seats disposed in said body, the first positioned in said first passage and the second positioned in said second passage and valve switching means movable into and out of engagement with said first and second seats thereby providing for communication in only the second passage, communication in both passages, and communication in only the first passage, said valve means comprising a first and a second plug member to respectively seal said first and second valve seats, a bimetallic assembly having two bimetallic members each responsive to temperature change, said members actuable at different temperatures thereby providing for the bimetallic assembly having a first, a second, and a third position, a motion transfer means causing said first and said second plug members to move from engagement with said first valve seat to engagement with neither of the two valve seats to engagement with said second valve seat when bimetallic assembly moves respectively from said first position to said second position to said third position, and a sealing member sealingly and slidably engaging said transfer means for isolating said first passage from said second passage and the second part of the body including a thermlly conductive portion adapted for heat-exchange with an object, such as an engine, for transferring heat to and from said bimetallic member to increase and decrease the temperature of the member in response to a corresponding increase and decrease in temperature of said object.

5. A thermally responsive valve assembly as set forth in claim 4 further comprising a spring for biasing said motion transfer means into engagement with said bimetallic assembly.

6. A thermally responsive valve assembly as set forth in claim 5 wherein said sealing member contains at least one wiper seal.

7. A thermally responsive valve assembly as set forth in claim 6 further comprising a wave spring positioned between said two bimetallic members.

8. A thermally responsive valve assembly as set forth in claim 7 wherein said first and second plug members are resilient and flexible with a generally conical shape to provide for sealing engagement with said first and second valve seats.

9. A thermally responsive valve assembly as set forth in claim 8 wherein said thermally conductive portion is made of metallic material having relatively high thermal conductivity, said thermally conductive portion having a threaded portion thereof adapted to be threaded in an opening in said object to insure good heat transfer relation between said object and said bimetallic member.

10. A thermally responsive valve assembly comprising a valve body, said body having a central chamber with a first and a second passage therein which are sealingly separated one from another, two valve seats disposed in said body, the first positioned in said first passage and the second positioned in said second passage, and valve switching means including bimetallic disc means and valve seat sealing means disposed in said chamber, said bimetallic disc means being movable in response to temperature change to cause said valve seat sealing means to move into and out of engagement with said first and second seats for regulating communication in said passages, said valve seat sealing means comprising first and second plug members to respectively seal said first and second valve seats, motion transfer means positioned to be in contact with said bimetallic disc means and to be movable in response to movement of said bimetallic disc means, and a sealing member sealingly and slidably engaging said motion transfer means allowing free movement of said motion transfer means to cause said pair of plug members to move into and out of engagement with said valve seats in response to movement of said bimetallic disc means while providing for isolation of the first passage from said second passage.

* * * * *